US007016092B2

(12) United States Patent
Takayama

(10) Patent No.: US 7,016,092 B2
(45) Date of Patent: Mar. 21, 2006

(54) OPTICAL SCANNING APPARATUS AND IMAGE FORMING APPARATUS USING THE SAME

(75) Inventor: Hidemi Takayama, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/128,541

(22) Filed: May 13, 2005

(65) Prior Publication Data

US 2005/0259307 A1 Nov. 24, 2005

(30) Foreign Application Priority Data

May 18, 2004 (JP) ............................ 2004-147913

(51) Int. Cl.
*G02B 26/08* (2006.01)

(52) U.S. Cl. ...................................... 359/204; 347/243

(58) Field of Classification Search ................ 359/204
See application file for complete search history.

(56) References Cited

U.S. PATENT DOCUMENTS 6,304,360 B1 * 10/2001 Sekikawa .................. 359/204

FOREIGN PATENT DOCUMENTS

JP 1-281468 A 11/1989
JP 2002-148546 A 5/2002
JP 2004-78089 A 3/2004

* cited by examiner

*Primary Examiner*—James Phan
(74) *Attorney, Agent, or Firm*—Morgan & Finnegan LLP

(57) ABSTRACT

Provided are an optical scanning apparatus, which keeps an oblique incident angle to be small with respect to a polygon mirror in a sub-scanning section to provide preferable optical performance with a compact and simple construction, and an image forming apparatus using the optical scanning apparatus. The optical scanning apparatus includes a plurality of light source means, an incident system turn back mirror that reflects light beams emitted from the plurality of light source means, a light deflector that deflects the plurality of light beams using the same deflecting surface, and an imaging optical system that guides the light beams deflected by the light deflector respectively onto a plurality of surfaces to be scanned. At the time of light-scanning of the plurality of surfaces to be scanned, the incident system turn back mirror is disposed in an effective scanning range in a main scanning section when it is projected in the main scanning section. Also, in the sub-scanning section, the multiple light beams are reflected by the incident system turn back mirror in mutually different directions with respect to the normal line direction of the incident system turn back mirror, and then made incident at mutually different angles with respect to the same deflecting surface of the light deflector.

9 Claims, 7 Drawing Sheets

OPTICAL SCANNING APPARATUS AND IMAGE FORMING APPARATUS USING THE SAME

BACKGROUND OF THE INVENTION

1. Field of the Invention

The present invention relates to an optical scanning apparatus and an image forming apparatus using the optical scanning apparatus. In particular, the present invention relates to an optical scanning apparatus, which is suited for an image forming apparatus such as a laser beam printer (LBP), a digital copying machine, or a multifunctional printer (versatile printer) each including an electrophotographic process. In the optical scanning apparatus, a light beam emitted from light source means is reflected and deflected by a polygon mirror serving as a light deflector and passes through an imaging optical system, then a surface to be scanned is scanned with the light beam to record image information.

2. Related Background Art

Conventionally, in an image forming apparatus such as a laser beam printer or a digital copying machine, a light flux (beam) light-modulated in accordance with an image signal and emitted from light source means composed of a semiconductor laser or the like is periodically deflected by a light deflector composed of a rotating polygon mirror (polygon mirror) or the like. The light beam is then converged in a spot manner onto a photosensitive recording medium (photosensitive drum) surface by an imaging optical system (scanning lens system) having fθ characteristics, so that the recording medium surface is scanned with the light beam, thereby performing image recording.

FIG. 7 is a main portion sectional view (main scanning sectional view) in a main scanning direction of an optical scanning apparatus used in a conventional image forming apparatus of this type.

In the drawing, a parallel light beam emitted from a laser unit 91 including a semiconductor laser is made incident on a cylindrical lens (condensing lens) 92 that has predetermined refractive power only in a sub-scanning direction. The parallel light beam made incident on the cylindrical lens 92 is emitted as maintaining its parallel light beam state in a main scanning section.

On the other hand, the parallel light beam is converged in a sub-scanning section, and imaged as a line image elongated in the main scanning direction in proximity to a deflecting surface (reflecting surface) 93*a* of a light deflector 93 composed of a rotating polygon mirror. Then, the light beam reflected and deflected by the deflecting surface 93*a* of the light deflector 93 is imaged by an imaging optical system (fθ lens system) 94 having fθ characteristics as a light spot on a surface of a photosensitive drum 95, that is a surface to be scanned. Then, the surface of the photosensitive drum 95 is repeatedly scanned with the light spot. The imaging optical system 94 includes a spherical lens 94*a* and a toric lens 94*b*.

In the optical scanning apparatus, a beam detector (BD) sensor 98 serving as a photodetector is provided in order to adjust a timing of start of image formation on the surface of the photosensitive drum 95 prior to scanning of the surface of the photosensitive drum 95 with the light spot. The BD sensor 98 receives a BD light beam that is a part of the light beam reflected and deflected by the light deflector 93. In other words, the BD sensor 98 receives a light beam during scanning of a region other than an image forming region prior to scanning of the image forming region on the surface of the photosensitive drum 95. The BD light beam is reflected by a BD mirror 96 and then condensed by a BD lens (condensing lens) 97 to be incident on the BD sensor 98. Then, a BD signal (synchronizing signal) is detected from an output signal of the BD sensor 98 to adjust a start timing of image recording on the surface of the photosensitive drum 95 based on the BD signal.

The photosensitive drum 95 rotates at a constant speed in synchronization with a driving signal of the semiconductor laser in the laser unit 91, and the surface of the photosensitive drum 95 moves in the sub-scanning direction with respect to the light spot with which the surface is scanned. As a result, an electrostatic latent image is formed on the surface of the photosensitive drum 95. Then, the electrostatic latent image is developed by a known electrophotographic process and transferred onto a transfer target material such as paper, whereby the electrostatic latent image is visualized.

Also, a multiple image forming apparatus using an imaging optical system generally performs image formation by forming images in different colors in a plurality of image forming portions, conveying paper using a conveyance means such as a conveyance belt, and transferring the images onto the paper to be superimposed one another.

In particular, when a full-color image is to be obtained by performing multicolor development, even a slight misregistration leads to degradation of image quality. In the case of 400 dpi, for instance, even misregistration of a fraction of one pixel (one pixel corresponds to 63.5 μm) results in a change appeared as color misregistration or color tint drift, and significantly degrades image quality. Conventionally, in view of this problem, the image drift is alleviated by performing color development using the same imaging optical system, that is, by performing light-scanning with the same optical characteristics.

With this method, however, there has been a problem in that it takes a long time to output a multiplex image or a full-color image. In order to solve the problem, there has been a method with which images in respective colors are obtained through image formation using multiple different optical scanning apparatuses, and transferred onto paper conveyed by a conveyance portion to be superimposed one another.

In this case, however, there is apprehension that color misregistration will occur when the images are superimposed one another. As an effective method of solving the problem, there has been a method with which an image position is detected and an image forming portion is controlled so as to correct an image in accordance with a detection signal (see Japanese Patent publication No. H01-281468).

Meanwhile, in an image forming apparatus in which multiple photosensitive members are scanned with light beams, imaging optical systems are ordinarily provided as many as the photosensitive members in order to form latent images on the multiple photosensitive members. In this case, there has been a problem in that optical components are required as many as the imaging optical systems, which increases cost because the light deflector (polygon mirror) and the like in particular are expensive. Also, in the case of particularly high-speed and high-definition imaging optical systems, the problem becomes more serious because the light deflectors are increased in size and required to have capacities for high-speed deflection at the same time.

In addition, a full-color image forming apparatus that is compact, inexpensive, and capable of realizing high image quality has been desired recently. As one method of satisfying this demand, there has been proposed a system in which a single common polygon mirror is used to scan with multiple light beams so that the number of components can be reduced, thereby achieving cost reduction.

In the case where a common polygon mirror is used, optical path separation is required in order to guide respective multiple beams (light beams) to different surfaces to be scanned. Therefore, a method has been proposed with which the beams are made incident on the polygon mirror at different angles in the sub-scanning direction (see Japanese Patent Application Laid-Open No. 2002-148546 and Japanese Patent Application Laid-Open No. 2004-78089).

With the conventional method, however, light beams other than a light beam having a small incident angle in the sub-scanning direction need to be made incident onto the polygon mirror at larger angles, which tends to increase the beam incident angles onto the polygon mirror in the sub-scanning section. In particular, when the imaging optical systems is a reduction system in the sub-scanning direction, the incident system tends to be increased in length in order to secure a light amount. In order to decrease the imaging optical system in size, the light beam is turned back using a turn back mirror or the like.

Also, in an overfilled imaging optical system (OFS), in order to suppress pupil diameter fluctuations due to inclination of a polygon facet, it is desirable for a scanning light beam to be so-called confrontational incident (frontal incident), so that a reflection angle of a scanning light beam on a deflecting surface at a scanning center in the main scanning section is set to be zero.

FIG. 8 is a sub-scanning sectional view of a main portion of a conventional optical scanning apparatus using a common polygon mirror.

In the drawing, reference numeral 19 denotes an incident system turn back mirror, numeral 17 a scanning lens system, numeral 18 a polygon mirror, numeral 18A a deflecting surface (reflecting surface), numeral 18B a rotation axis, and 16A and 16B each a scanning system turn back mirror. Light beams A and B are incident on the polygon mirror 18 at different incident angles (oblique incident angles), for example, 1.5° and 2.4°, in the sub-scanning section, deflected (reflected and deflected) at different angles by the deflecting surface 18A of the polygon mirror, and separated by the scanning system turn back mirrors 16A and 16B to be reflected toward different surfaces to be scanned. Note that, it is required to give an incident angle of around 1.5° to the light beam B having a smaller oblique incident angle in order to prevent the light beam B from interfering with the incident system turn back mirror 19.

In addition, in order to separate the optical paths of the scanning light beams from each other, it is required to make the respective light beams incident on the polygon mirror 18 at different angles and to make the light beam A incident on the deflecting surface 18A with a larger angle of around 2.4°.

In a case where a light beam is obliquely made incident on a polygon mirror with a large angle in a sub-scanning section, there has been a problem in that a position of the deflecting surface of the polygon mirror moves back and forth, which causes so-called pitch unevenness in which a beam reaching position in the sub-scanning direction is displaced.

With a conventional technique, the pitch unevenness is suppressed by reducing a relative amount of eccentricity of each deflecting surface of the polygon mirror. In this case, however, the cost is increased. Also, when it is impossible to adopt a high-precision polygon mirror, image quality is degraded. In addition, if the oblique incident angle is large, there have been such problems in that bending of a scanning line is easy to occur, and in that spot performance is deteriorated.

SUMMARY OF THE INVENTION

An object of the present invention is to provide an optical scanning apparatus, which is provided with preferable optical performance by reducing the thickness of a light deflector and by suppressing scanning line bending on a surface to be scanned, and an image forming apparatus that uses the optical scanning apparatus.

According to one aspect of the invention, an optical scanning apparatus that light-scans a plurality of surfaces to be scanned, comprises: a plurality of light source means; a first turn back mirror that reflects a plurality of light beams emitted from the plurality of light source means; a light deflector that deflects the plurality of light beams reflected by the first turn back mirror, using a same deflecting surface; and an imaging optical system that guides the plurality of light beams deflected by the same deflecting surface of the light deflector onto the plurality of surfaces to be scanned, respectively, wherein the first turn back mirror is arranged in an effective scanning range in a main scanning section when the first turn back mirror is projected in the main scanning section, wherein, in a sub-scanning section, the plurality of light beams are reflected by the first turn back mirror in mutually different directions with respect to a normal line direction of a reflecting surface of the first turn back mirror and are incident at mutually different angles with respect to the same deflecting surface of the light deflector, and the following condition is satisfied, $$2L\cdot\tan(\theta/2)<2L\cdot\tan\alpha-d\leqq 10,$$

where d represents a largest interval on the first turn back mirror in the sub-scanning direction between two principal rays among principal rays of the plurality of light beams reflected in the mutually different directions with respect to a normal line direction of said reflecting surface of the first turn back mirror, $\alpha$ represents an angle in the sub-scanning direction formed by the principal ray of the light beam among the plurality of light beams incident at the mutually different angles, having a smallest incident angle with respect to a normal line thereof, and the normal line of the deflecting surface, $\theta$ represents an incident angle in the sub-scanning direction determined by an F-number of the light beam having the smallest incident angle, and L represents a distance between the deflecting surface of the light deflector and the reflecting surface of the first turn back mirror.

According to a further aspect of the invention, in the optical scanning apparatus, reflection angles of two light beams reflected in mutually different directions with respect to the normal line direction of the reflecting surface of the first turn back mirror are equal to each other in the sub-scanning section.

According to a further aspect of the invention, in the optical scanning apparatus, two light beams reflected in mutually different directions with respect to the normal line direction of the reflecting surface of the first turn back mirror cross each other in a vicinity of the first turn back mirror in the sub-scanning section.

According to a further aspect of the invention, in the optical scanning apparatus, in the sub-scanning section, the plurality of light beams incident at the mutually different angles with respect to the normal line of the deflecting surface are reflected in mutually different directions with respect to the deflecting surface.

According to a further aspect of the invention, in the optical scanning apparatus, the plurality of light beams deflected by the light deflector respectively pass outside of the different end portions of both end portions of the reflecting surface of the first turn back mirror in the sub-scanning section.

According to a further aspect of the invention, the optical scanning apparatus comprises: at least one second turn back mirror that is provided in an optical path between the light deflector and the surfaces to be scanned and reflects the light beams deflected by the deflecting surface of the light deflector, wherein the at least one second turn back mirror is arranged at a position farther from the light deflector than the first turn back mirror from the light deflector.

According to a further aspect of the invention, in the optical scanning apparatus, the plurality of light beams reflected in the mutually different directions with respect to the normal line direction of the reflecting surface of the first turn back mirror pass through at least one scanning optical element constituting the imaging optical system to be deflected by the light deflector, and then pass through the scanning optical element again.

According to another aspect of the invention, a color image forming apparatus comprises at least one optical scanning apparatus set out in the foregoing and a plurality of image bearing members, wherein the plurality of image bearing members are disposed on respective surfaces to be scanned of the at least one optical scanning apparatus, and the plurality of image bearing members form images in mutually different colors.

According to a further aspect of the invention, the color image forming apparatus comprises: a printer controller that converts a color signal inputted from an external device into image data for the mutually different colors and inputs the image data into the at least one optical scanning apparatus.

DESCRIPTION OF THE PREFERRED EMBODIMENTS

Hereinafter, embodiments of the present invention will be described with reference to the accompanying drawings.

<First Embodiment>

Figure 1:
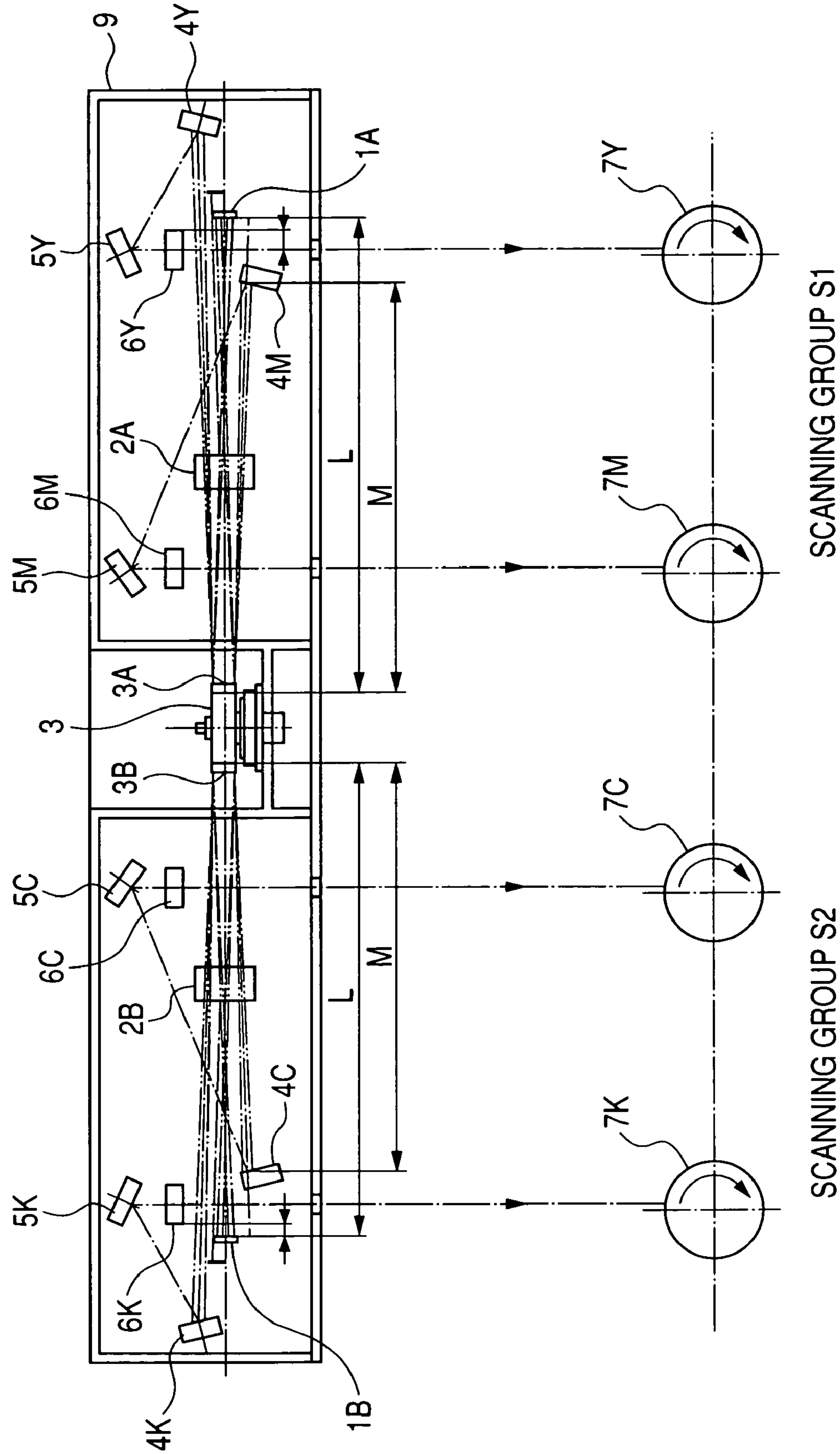
FIG. 1 is a sub-scanning sectional view of a first embodiment of the present invention.

FIG. 1 is a main portion sectional view (sub-scanning sectional view) taken in a sub-scanning direction of a first embodiment of the present invention.

Here, a main scanning direction refers to a direction perpendicular to a rotation axis of a light deflector and to an optical axis of an imaging optical system (direction in which a light beam is reflected and deflected (deflected and scanned) by the light deflector), and the sub-scanning direction refers to a direction parallel to the rotation axis of the light deflector. Also, a main scanning section refers to a plane parallel to the main scanning direction and containing the optical axis of the imaging optical system, and a sub-scanning section refers to a section perpendicular to the main scanning section.

In this embodiment, multiple light beams from multiple light source means (not shown) that each emit multiple light beams (two light beams are emitted in this embodiment, although three or more light beams may be emitted) modulated in accordance with an image signal are divided into two scanning groups (imaging optical systems) S1 and S2. These two scanning groups S1 and S2 are constructed bilaterally symmetrically with respect to the light deflector (polygon mirror) 3. The two scanning groups S1 and S2 have the same optical action, so the following description will be made by taking, as an example, a case of the scanning group S1 in the right half of the drawing.

In the drawing, reference symbols 7M and 7Y each denote a photosensitive drum where a photosensitive layer is applied to an electric conductor and an electrostatic latent image is formed by a light beam emitted from a scanning optical portion contained in an optical box 9.

Reference numeral 3 denotes a common light deflector that is composed of, for instance, a polygon mirror (rotating polygon mirror), and is rotated at a constant speed by a driving means (not shown) such as a motor.

Reference symbol 2A denotes a first scanning lens, and reference symbols 6M and 6Y each indicate a second scanning lens.

In this embodiment, the first scanning lens 2A and the second scanning lens 6M constitute a first scanning lens system, and the first scanning lens 2A and the second scanning lens 6Y constitute a second scanning lens system. Also, the first scanning lens system and the second scanning lens system constitute an imaging optical system.

The first scanning lens system and the second scanning lens system have an optical face tangle error correction function by imaging the light beam based on image information deflected by the polygon mirror 3 onto surfaces of photosensitive drums 7M and 7Y serving as surfaces to be scanned, and by establishing a conjugate relation between the deflecting surface 3A of the polygon mirror 3 and the surfaces of the photosensitive drums 7M and 7Y in the sub-scanning section.

Reference symbol 1A denotes a common incident system turn back mirror (turn back mirror in an incident optical system) and is disposed within an effective scanning range of two light beams deflected by the polygon mirror 3 in the main scanning section when the common incident system turn back mirror is projected in the main scanning section.

In this embodiment, a so-called double path construction is adopted in which two light beams reflected by the incident system turn back mirror 1A pass through the first scanning lens 2A to be deflected by the polygon mirror 3, and then pass through the first scanning lens 2A again.

Reference symbols 4Y and 5Y respectively denote a first turn back mirror and a second turn back mirror of the scanning system that are provided in the optical path of the second scanning lens system and reflect the light beams in predetermined directions. Reference symbols 4M and 5M respectively denote a first turn back mirror and a second turn back mirror of the scanning system that are provided in the optical path of the first scanning lens system and reflect the light beams in predetermined directions.

In this embodiment, the first turn back mirror 4Y is arranged at a position farther from the polygon mirror 3 than the incident system turn back mirror 1A, and the first turn back mirror 4M is arranged at a position closer to the polygon mirror 3 than the incident system turn back mirror 1A.

Reference numeral 9 denotes an optical box that contains each component of the scanning optical portion.

In this embodiment, the scanning optical portion is arranged above the photosensitive drums. In the scanning optical portion, two light beams are made incident on both sides of one polygon mirror 3 respectively, guides the light beams onto their corresponding photosensitive drum surfaces, and prints a color image at high speed.

Next, the optical action of this embodiment will be described.

In this embodiment, two light beams emitted from the incident optical system (not shown) are incident on the incident system turn back mirror 1A from different directions with respect to a normal line of the surface of the incident system turn back mirror 1A in the sub-scanning section. Then, assuming that the normal line direction of the reflecting surface of the incident system turn back mirror 1A in the sub-scanning section is set to 0, one side with respect to the normal line direction is set as positive, and the other side with respect to the normal line direction is set as negative, the two light beams reflected by the incident system turn back mirror 1A are reflected in mutually different directions with respect to the normal line direction, that is, at reflection angles whose signs are different from each other and whose degrees are equal to each other, cross each other in proximity to the incident system turn back mirror 1A in the sub-scanning section, and then are incident on the polygon mirror 3 at mutually different angles with respect to the normal line of the deflecting surface 3A of the polygon mirror 3 (oblique incident optical system).

Assuming that the normal line direction of the deflecting surface 3A of the polygon mirror 3 in the sub-scanning section is set as 0, one side with respect to the normal line direction is set as positive, and the other side with respect to the normal line direction is set as negative, the two light beams incident on the polygon mirror 3 are reflected in mutually different directions with respect to the normal line direction, that is, at reflection angles with different signs. The two light beams are then each refracted by the first scanning lens 2A to be respectively separated in optical path by the first turn back mirrors (4Y and 4M) of the scanning system, and then are respectively reflected toward the second turn back mirrors (5Y and 5M) of the scanning system.

It should be noted here that the reflection angles with mutually different signs with respect to the normal line direction of the reflecting surface of the incident system turn back mirror 1A refer to a reflection angle of a light beam reflected to a photosensitive drum side (one side), and a reflection angle of a light beam reflected to a side opposite to the photosensitive drum side (other side) with respect to the normal line direction in the sub-scanning section.

Also, the reflection angles with mutually different signs with respect to the normal line direction of the deflecting surface 3A of the polygon mirror 3 refer to a reflection angle of the light beam reflected to the photosensitive drum side (one side) and a reflection angle of the light beam reflected to the side opposite to the photosensitive drum side (other side) with respect to the normal line direction in the sub-scanning section.

Then, the light beams reflected by the second turn back mirrors (5Y and 5M) of the scanning system are refracted by the second scanning lenses (6Y and 6M), form light spots on the photosensitive drum (7Y and 7M) surfaces, and perform scanning through rotation of the polygon mirror 3. Also, the photosensitive drums (7Y and 7M) rotate in the directions indicated by the arrows and electrostatic latent images are sequentially formed with respect to the sub-scanning direction.

Like in the case of the scanning group S1, the light beams directed toward the photosensitive drums (7C and 7K) of the scanning group S2 also form electrostatic latent images, and a multicolor image is formed on paper through a electrophotographic process (not shown) including development, transfer, and fixation.

Figure 2:
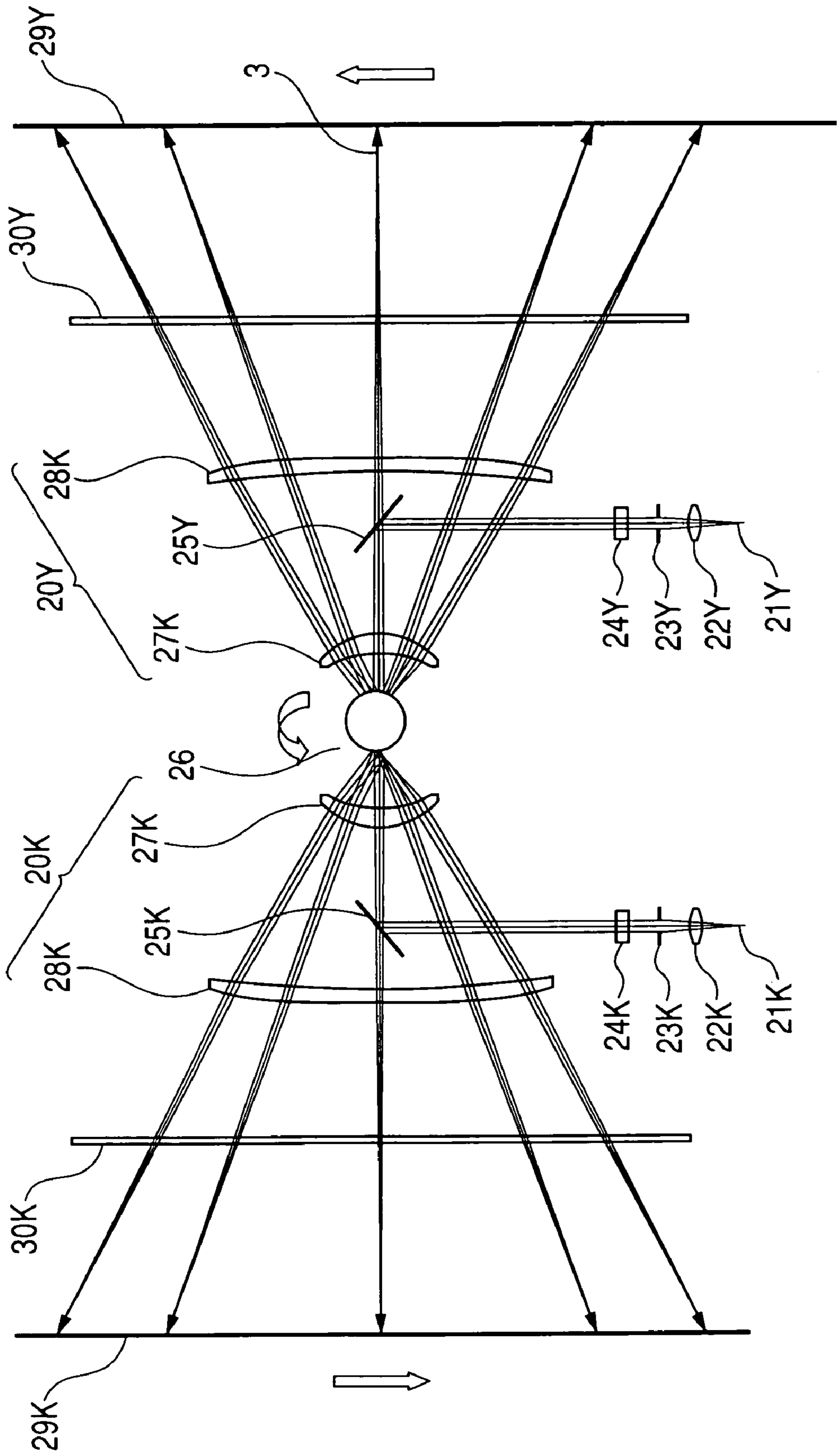
FIG. 2 is a main scanning sectional view of the first embodiment of the present invention.

FIG. 2 is a main portion sectional view (main scanning sectional view) taken in the main scanning direction of the first embodiment of the present invention.

In the drawing, a developed view of an imaging optical system that performs drawing on a photosensitive drum 29Y (corresponding to 7Y in FIG. 1) of the scanning group S1, and an imaging optical system that performs drawing on a photosensitive drum 29K (corresponding to 7K in FIG. 1) of the scanning group S2 is shown.

In the drawing, reference symbols 21Y and 21K each denote a light source means that emits two light beams modulated in accordance with an image signal and has two light sources composed of a semiconductor laser or the like. Note that the light source means may be light source means having two light emission portions, for instance.

Reference symbols 22Y and 22K each denote a conversion optical element (collimator lens or the like) that converts the two light beams (incident light beams) emitted from corresponding one of the light source means 21Y and 21K into substantially parallel light beams (or substantially divergent light beams or substantially convergent light beams). Reference symbols 23Y and 23K each denote an aperture stop that limits two passing light beams converted into the substantially parallel light beam by the conversion optical element (22Y, 22K), thereby shaping a beam shape.

Reference symbols 24Y and 24K each denote a cylindrical lens serving as a condensing lens that has predetermined refractive power (optical power) only in the sub-scanning direction and temporarily images the two light beams passed through the aperture stop (23Y, 23K) as an almost line image in proximity to the deflecting surface of a common polygon mirror 26 (corresponding to 3 in FIG. 1) in the sub-scanning section.

Reference symbols 25Y and 25K (corresponding to 1A and 1B in FIG. 1) each denote an incident system turn back mirror and are disposed within a scanning range of the two light beams deflected by the polygon mirror 26 in the main scanning section.

It should be noted here that each of the elements such as the collimator lenses (22Y and 22K), the aperture stop (23Y and 23K), the cylindrical lenses (24Y and 24K), and the incident system turn back mirrors (25Y and 25K) constitutes one element of the incident optical system.

Reference symbols 20Y and 20K each denote a scanning lens system that includes a first scanning lens (27Y, 27K) (corresponding to 2A, 2B in FIG. 1) and a second scanning lens (28Y, 28K) (corresponding to 6Y, 6K in FIG. 1). In the scanning lens system, the two light beams (scanning light beams) based on image information and reflected and deflected by the polygon mirror 26 are imaged on corresponding one of surfaces of photosensitive drums (29Y and 29K) (corresponding to 7Y and 7K in FIG. 1) serving as surfaces to be scanned, and a conjugate relation between the deflecting surface of the polygon mirror 26 and the photosensitive drum surface (29Y, 29K) in the sub-scanning section is established, thereby realizing an optical face tangle error correction function.

It should be noted here that the scanning system and the first and second turn back mirrors 4Y and 5Y (4K and 5K) are omitted.

In the drawing, the two light beams emitted from each of the semiconductor lasers (21Y, 21K) are converted into substantially parallel light beams by passing through the collimator lens (22Y, 22K), regulated by the stop (23Y, 23K), and is incident on the cylindrical lens (24Y, 24K). The cylindrical lens (24Y, 24K) has positive optical power in the sub-scanning direction. The incident light beam is reflected by the incident system turn back mirror (25Y, 25K), and condensed in a line manner in proximity to the polygon mirror 26 in the sub-scanning direction after passing through the first scanning lens (27Y, 27K).

At this time, the width in the main scanning direction of each light beam incident on the deflecting surface is larger than the width of the deflecting surface (overfilled imaging optical system). Each of the light beams is incident on the deflecting surface from the center of the deflecting angle of the polygon mirror 26 or approximately the center thereof (frontal incident). Then, the polygon mirror 26 deflects each of the light beams through rotation at a constant speed, the fθ characteristics of the deflected light beam is corrected by the first scanning lens (27Y, 27K) and the second scanning lens (28Y, 28K) The corrected light beam forms a spot on the surface to be scanned (29Y, 29K), and scanning is performed through rotation of the polygon mirror 26.

As described above, the incident system turn back mirror (25Y, 25K) is disposed within a range where the scanning light beam is scanned in the main scanning section. In this embodiment, the incident system turn back mirror (25Y, 25K) and the scanning light beam are spaced apart from each other in the sub-scanning direction with this configuration so that the incident system turn back mirrors and the scanning light beam do not interfere with each other.

The reasons why the incident system turn back mirror (25Y, 25K) is disposed within the scanning region are as follows. With this construction, it becomes possible to construct a compact imaging optical system in a system whose incident optical system is long. In addition, in an overfilled imaging optical system, when the reflection angle of a light beam by a polygon mirror increases, a spot diameter in the main scanning direction increase and the light amount of the light spot reduces at the same time, so with the construction described above, it becomes possible to reduce spot diameter variation and light amount variation in the scanning region.

Figure 3:
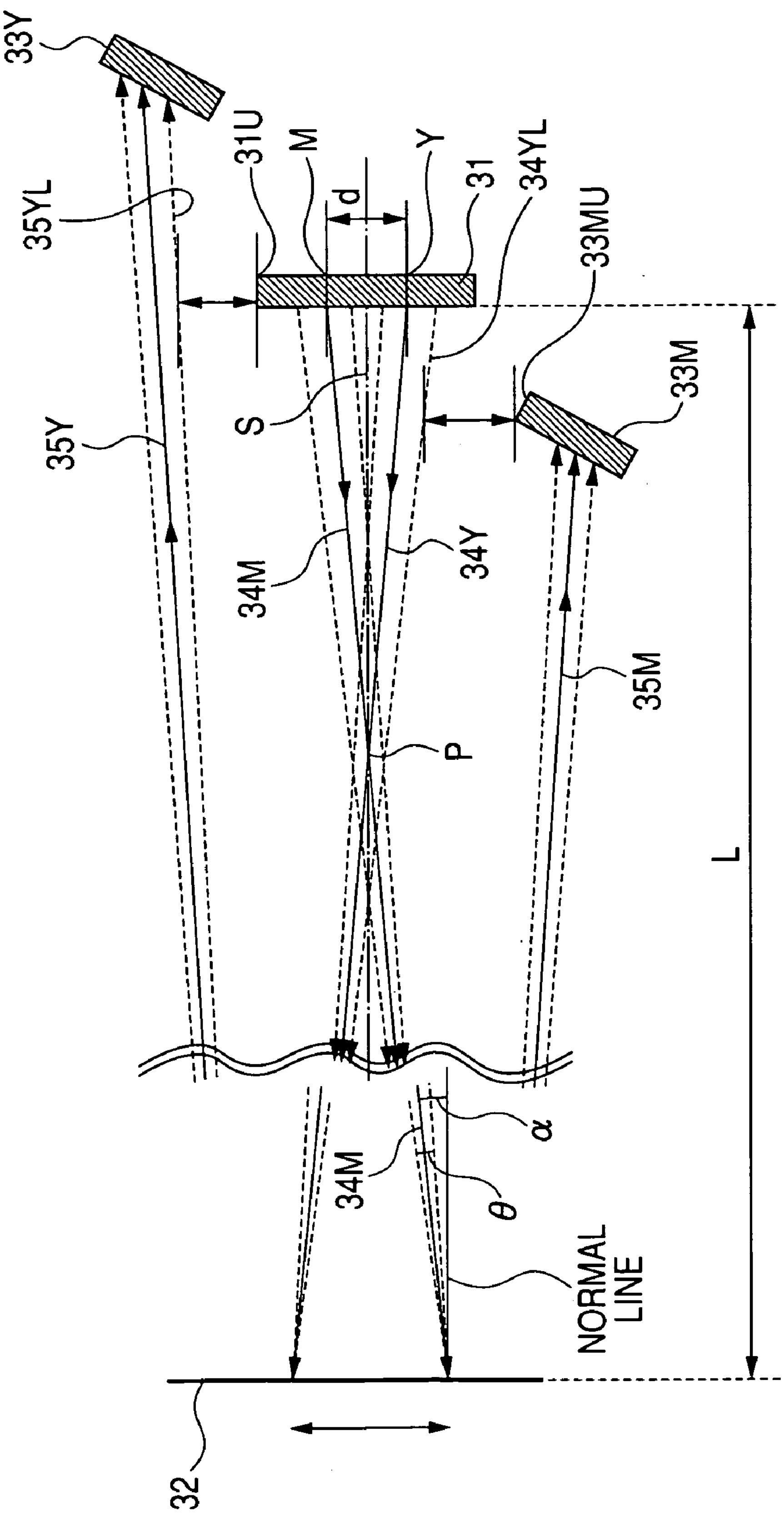
FIG. 3 is an explanatory diagram where a vicinity of a polygon mirror in the first embodiment of the present invention is enlarged.

FIG. 3 is a main portion sectional view (sub-scanning sectional view) taken in the sub-scanning direction and showing the proximity of the incident system turn back mirror and the proximity of the deflecting surface of the polygon mirror in the first embodiment of the present invention.

In the drawing, reference numeral 31 (corresponding to 1A in FIG. 1) denotes the incident system turn back mirror, reference numeral 32 (corresponding to 3A in FIG. 1) the deflecting surface of the polygon mirror, reference numerals 33Y and 33M (corresponding to 4Y and 4M in FIG. 1) each the first turn back mirror of the scanning system, reference numerals 34Y and 34M each a principal ray of a light beam (incident light beam) reflected by the incident system turn back mirror 31 and to be reflected by the deflecting surface 32, and reference numerals 35Y and 35M each a principal ray of a light beam (scanning light beam) after reflected by the deflecting surface 32. Also, each dotted line indicates a marginal ray of the light beam.

In the drawing, two incident light beams incident on the incident system turn back mirror 31 from an incident optical system (not-shown) are reflected at reflection angles whose signs are different from each other with respect to the normal line direction of the incident system turn back mirror 31 and whose degrees are equal to each other, as described above. Then, as indicated by optical paths of the incident light beams 34Y and 34M, the light beams cross each other in the sub-scanning section at a point P in proximity to the incident system turn back mirror 31 and then incident at mutually different angles with respect to the normal line of the deflecting surface 32.

In proximity to the polygon mirror, a so-called optical face tangle error correction system is provided, in which each of the incident light beams 34Y and 34M are temporarily imaged in the sub-scanning direction so that beam positional displacement on the photosensitive drum surface with respect to the inclination of the deflecting surface 32 is corrected.

Then, the two incident light beams 34Y, 34M are reflected by the first turn back mirrors (33Y and 33M) of each of the scanning systems toward the second turn back mirrors (not shown) of the scanning system at reflection angles with mutually different signs with respect to the normal line direction of the deflecting surface 32, as described above.

In order to reflect each of the scanning light beams 35Y and 35M toward the second turn back mirror (not shown) of the scanning system as shown in the drawing, it is required to make the incident light beam 34Y incident on the deflecting surface 32 with a certain oblique incident angle, thereby preventing the upper end 31U of the incident system turn back mirror 31 and the light beam lower end 35 YL of the scanning light beam 35Y from interfering with each other.

On the other hand, as to the incident light beam 34M, in order to dispose the first turn back mirror 33M for turning back the scanning light beam 35M on a polygon mirror 32 side with respect to the incident system turn back mirror 31, it is required to arrange the upper end 33MU of the first turn back mirror 33M of the scanning system between the light beam lower end 34YL of the incident light beam 34Y and the light beam upper end of the scanning light beam 35M, and to set an incident angle into the deflecting surface 32 so that the incident light beam 34M does not interfere with the light beam lower end 34YL of the incident light beam 34Y.

Figure 8:
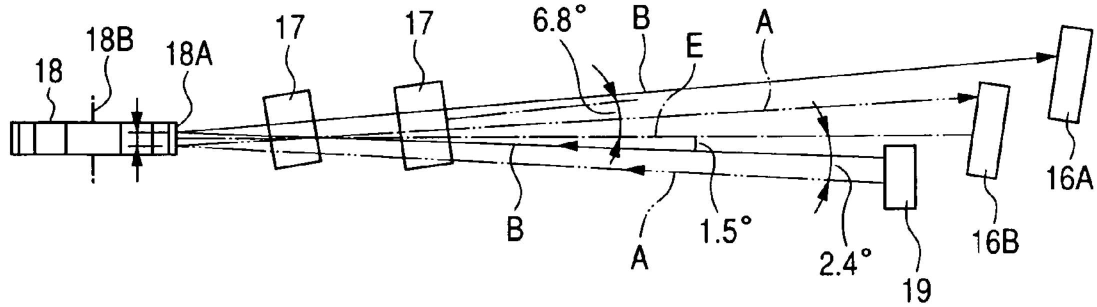
FIG. 8 is a sub-scanning sectional view of the conventional optical scanning apparatus.

Therefore, in this embodiment, as described above, the two light beams are reflected by the incident system turn back mirror 1A at reflection angles whose signs are different from each other with respect to the normal line direction of the reflecting surface of the incident system turn back mirror 1A and whose degrees are equal to each other, and then the reflected incident light beams 34M and 34Y are made incident on the deflecting surface 32 at angles with mutually different signs with respect to the normal line of the deflecting surface 32. With this configuration, it becomes possible to make the light beams incident on the deflecting surface at incident angles (oblique incident angles) that are approximately half of those in the conventional example shown in FIG. 8 (incident light beams A and B are made incident on the deflecting surface at incident angles with the same sign), and therefore it becomes possible to obtain an optical scanning apparatus having preferable optical performance where pitch unevenness is suppressed.

Here, when the two incident light beams 34M and 34Y reflected by the incident system turn back mirror 31 are caused to cross each other at a position that is as close to the incident system turn back mirror 31 as possible, distances from the incident light beams 34M and 34Y to the end portions of the incident system turn back mirror 31 are increased, which seems to be advantageous to the light beam separation. However, when a distance between the crossing position and the incident system turn back mirror 31 is reduced too much, a distance of the incident light beams on the incident system turn back mirror 31 increases and therefore the size in the sub-scanning direction of the incident system turn back mirror 31 is increased, which is disadvantageous to the optical path separation. In addition, a distance between the light beams on the polygon mirror increases, so the size of the polygon mirror increases, which leads to an increase in cost.

Therefore, in this embodiment, letting d represent a principal ray interval (beam cross interval) on the incident system turn back mirror 31 between the principal rays 34M and 34Y of the two incident light beams reflected by the mirror 31 (a principal ray interval between the light beams in the case of two light beams, and a principal ray interval between light beams on ends in the case of three or more light beams), $\alpha$ represent an angle formed by the principal ray of one of the two light beams incident on the deflecting surface 32 of the polygon mirror that has a smaller incident angle and the normal line of the deflecting surface 32, $\theta$ represent an incident angle determined by the F-number of one of the two light beams incident on the polygon mirror that has a smaller incident angle, and L represent an interval between the deflecting surface 32 of the polygon mirror and the reflecting surface of the incident system turn back mirror 31, each element is set so that the following condition is satisfied, $$2L\cdot\tan(\theta/2)<2L\cdot\tan\alpha\text{-}d\leqq 10 \quad (1).$$

With this configuration, in this embodiment, it becomes possible to minimize the incident angle with respect to the deflecting surface 32 while preventing the scanning light beams 35Y and 35M and the incident system turn back mirror 31 interfering with each other.

In this embodiment, it is assumed that two light beams are reflected by the incident system turn back mirror 31, although the present invention is applicable even to a case where three or more light beams are reflected by the incident system turn back mirror 31.

In the case of three light beams, the principal ray interval (beam cross interval) d is defined as a largest interval in the sub-scanning section between principal rays of two light beams among the three light beams. When three or more light beams are reflected by the incident system turn back mirror 31, the principal ray interval (beam cross interval) d further increases, so the problem to be solved by the present invention becomes more serious.

It should be noted here that in this embodiment, the sign of the principal ray interval (beam cross interval) d in the conditional expression (1) given above is set as positive in a direction from a point M at which the principal ray 34M of one of the incident light beams is incident on the incident system turn back mirror 31 to a point Y at which the principal ray 34Y of the other of the incident light beams is incident on the incident system turn back mirror 31, and is set as negative in an opposite direction from the incident point Y to the incident point M where the points M and Y are interchanged with respect to the normal line S.

The conditional expression (1) is a condition for minimizing the incident angle with respect to the deflecting surface and reducing the thickness in the sub-scanning direction of the polygon mirror. If 2L·tan α-d is greater than the upper limit of the conditional expression (1), the width in the sub-scanning direction of the polygon mirror increases, leading to various problems such as an increase in cost of the polygon mirror itself, an increase of a load placed on the motor, and an increase in noise due to rotation, which is an unrealistic construction, and is not preferable. On the other hand, if 2L·tan α-d is not greater than the lower limit value of the conditional expression (1), the scanning light beams reflected by the polygon mirror and the incident system turn back mirror interfere with each other, which is not preferable.

Also, in reality, if the lower limit value of the conditional expression (1) is set to an edge of an allowable range, eclipse of the light beams may occurs even when a slight manufacturing error occurs. Also, since problems, such as chipping and edge chamfer, are likely to arise at the edge of the end portion of the turn back mirror, the optical scanning apparatus according to the present invention is required to be designed with consideration given to a margin of such problems.

Also, as to the upper limit value of the conditional expression (1), it is ordinarily desirable to be set to a value obtained by adding around 3 mm to the lower limit value, because the width of the polygon mirror in the sub-scanning direction can be made small by setting the upper limit value of the conditional expression (1) small.

It should be noted here that the optical scanning apparatus according to the present invention is not limited to the construction shown in FIG. 1 described above, and the present invention is also applicable to, for instance, an optical scanning apparatus that includes one light source means for emitting multiple beams, one light deflector, one imaging optical system, and one photosensitive drum, where the multiple light beams emitted from the light source means are made incident on the deflecting surface of the light deflector from an oblique direction through an incident system turn back mirror in a sub-scanning section to be deflected by the light deflector, and imaged on a surface of the photosensitive drum by the imaging optical system to light-scan the photosensitive drum surface.

In this embodiment, the resolution is set to 600 dpi. However, the present invention is aimed at suppressing pitch unevenness and spot diameter fluctuations and this problem becomes more serious as the resolution is increased. Therefore, in the case of an optical scanning apparatus of 1200 dpi or more, a particularly profound effect can be obtained.

<Second Embodiment>

Figure 4:
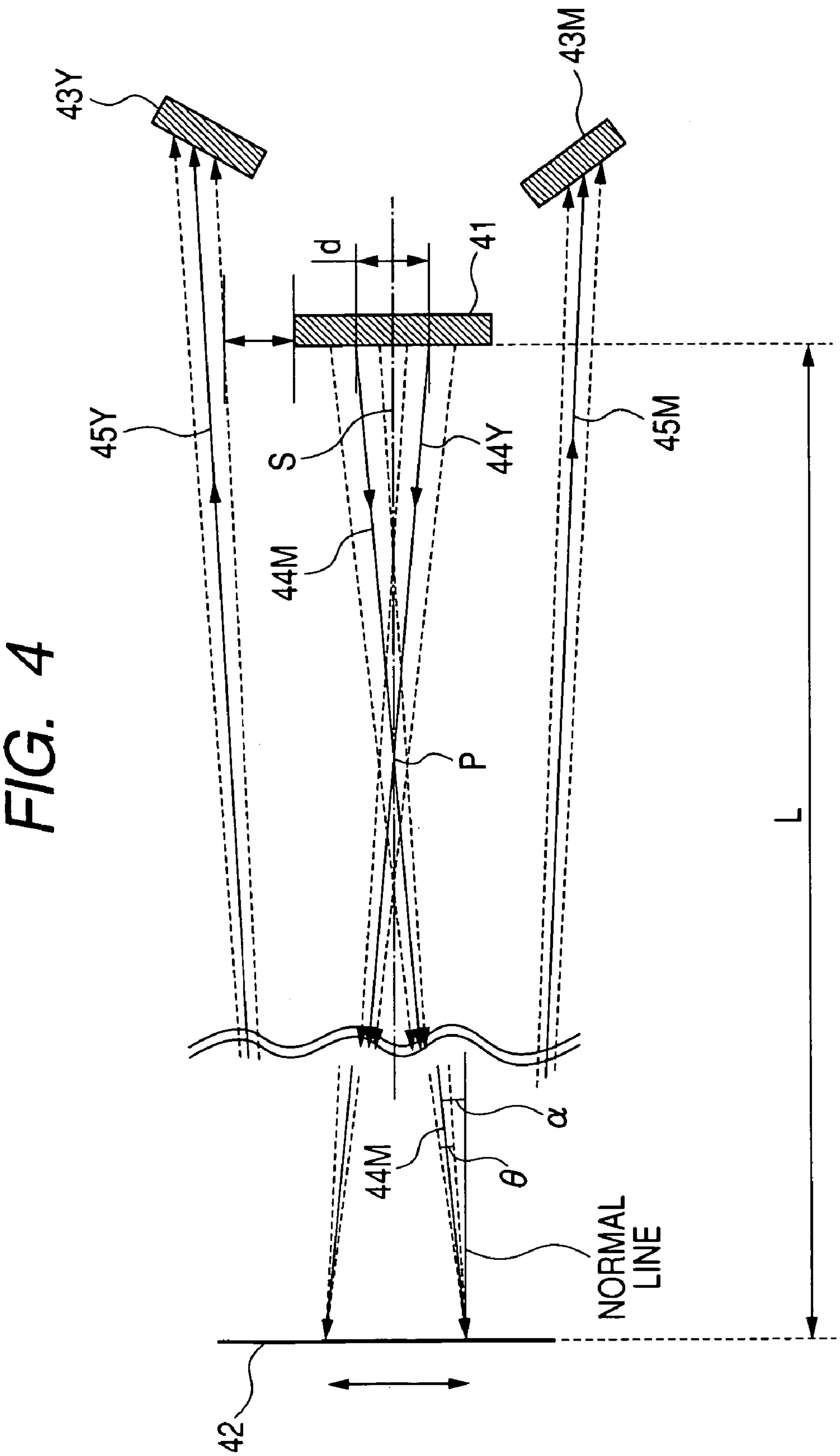
FIG. 4 is an explanatory diagram where a vicinity of a polygon mirror in a second embodiment of the present invention is enlarged.

FIG. 4 is a main portion sectional view (sub-scanning sectional view) taken in the sub-scanning direction and showing the vicinity of an incident system turn back mirror and the vicinity of a deflecting surface of a polygon mirror in a second embodiment of the present invention.

This embodiment differs from the first embodiment described above in that first turn back mirrors (43*y* and 43M) of a scanning system are disposed at positions farther from the light deflector than an incident system turn back mirror 41 from the light deflector. The rest of the construction and optical action are set approximately the same as those in the first embodiment, thereby providing the same effects.

That is, in the drawing, reference numeral 41 (corresponding to 1A in FIG. 1) denotes an incident system turn back mirror and reference numeral 42 (corresponding to 3A in FIG. 1) represents a deflecting surface of a polygon mirror. Reference numerals 43Y and 43M (corresponding to 4Y and 4M in FIG. 1) each indicate a first turn back mirror of a scanning system that is arranged at a position farther from the polygon mirror than the incident system turn back mirror 41 from the polygon mirror. Reference numerals 44Y and 44M each denote a principal ray of a light beam (incident light beam) reflected by the incident system turn back mirror 41 and to be reflected by the deflecting surface 42, and reference numerals 45Y and 45M each represent a principal ray of a light beam (scanning light beam) after reflected by the deflecting surface 42. Also, each dotted line indicates a marginal ray of the light beam.

In the drawing, two incident light beams are made incident on the incident system turn back mirror 41 by an incident optical system (not shown) and reflected at reflection angles whose signs are different from each other with respect to the normal line direction of the incident system turn back mirror 41 and whose degrees are equal to each other. Then, as indicated by optical paths of the incident light beams 44Y and 44M, the light beams cross each other in the sub-scanning section at a position P in proximity to the incident system turn back mirror 41 and then are made incident at mutually different angles with respect to the normal line of the deflecting surface 42.

In proximity to the polygon mirror, a so-called optical face tangle error correction system is provided, in which each of the incident light beams 44Y and 44M are temporarily imaged in the sub-scanning direction so that beam positional displacement on the photosensitive drum surface with respect to the inclination of the deflecting surface 42 is corrected.

Then, the two incident light beams 44Y and 44M are reflected at reflection angles with mutually different signs with respect to the normal line direction of the deflecting surface 42, respectively pass outside of the different end portions of both end portions of the incident system turn back mirror 41 in the sub-scanning section, and each reflected toward a second turn back mirror (not shown) of a scanning system by the first turn back mirror (43Y, 43M) of the scanning system.

In order to reflect each of the scanning light beams 45Y and 45M toward the second turn back mirror (not shown) of the scanning system as shown in the drawing, it is required to make the incident light beam 44Y incident on the deflecting surface with a certain oblique incident angle, so that the upper end of the incident system turn back mirror 41 and the light beam lower end of the scanning light beam 45Y do not interfere with each other.

Therefore, in this embodiment, like in the first embodiment described above, two light beams are reflected by the incident system turn back mirror 41 at reflection angles (in directions), whose signs are different from each other with respect to the normal line direction of the reflecting surface of the incident system turn back mirror 41 and whose degrees are equal to each other, and then the reflected incident light beams 44M and 44Y are made incident on the deflecting surface 42 at angles (in directions) with mutually different signs with respect to the normal line of the deflecting surface 42, thereby providing the same effects as in the first embodiment.

It should be noted here that, as to the incident light beam 44M, the first turn back mirror 43M of the scanning system is arranged at a position farther from the polygon mirror than the incident system turn back mirror 41, so it is unnecessary to consider interference between the light beam lower end of the incident light beam 44Y and the upper end of the first turn back mirror 43M of the scanning system, which makes it possible to further reduce the incident angle with respect to the polygon mirror.

Figure 5:
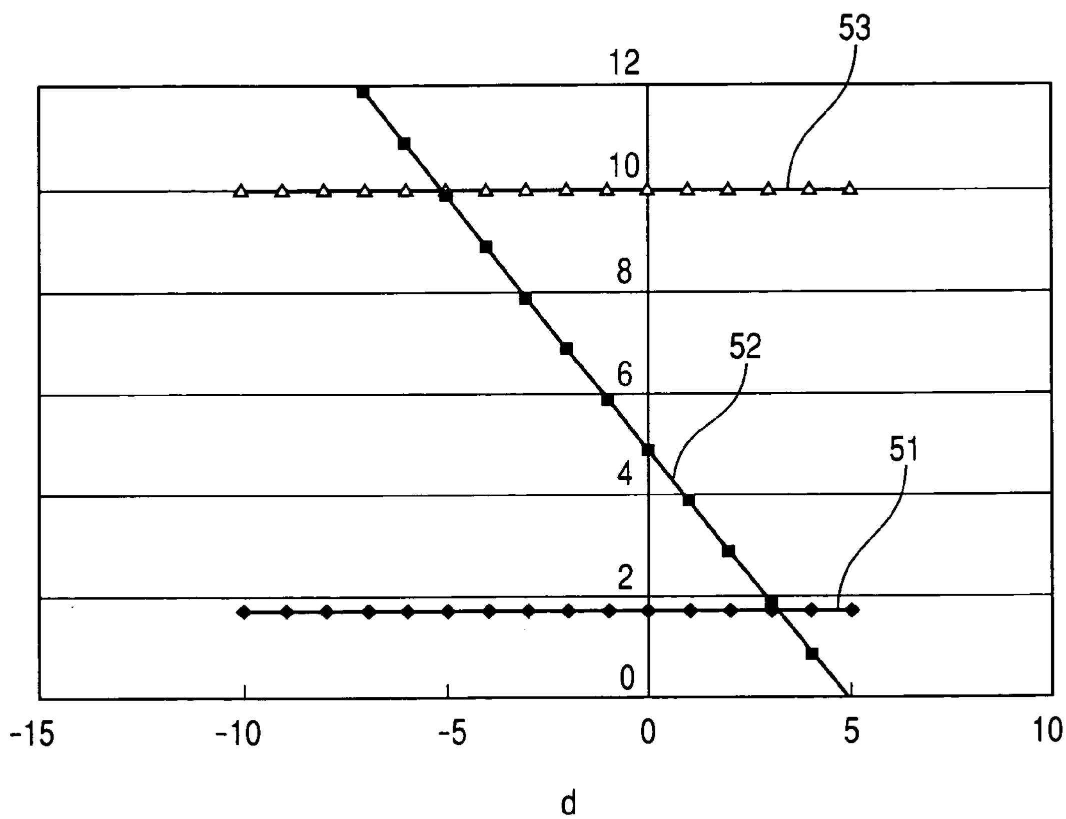
FIG. 5 is a graph showing a numerical value range of a conditional expression in the embodiment of the present invention.

FIG. 5 is a graph showing a numerical value range of the conditional expression (1) in the embodiments of the present invention.

In the drawing, reference numeral 51 denotes lower limit values of the conditional expression (1), reference numeral 52 central values of the conditional expression (1), and reference numeral 53 upper limit values of the conditional expression (1). A numerical value range of the beam cross interval d is shown in the case where $\theta$ is set to 1.0°, L is set to 100 mm, and $\alpha$ is set to 1.4° in the conditional expression (1).

Here, the conditional expression (1) is satisfied in a range of the line 52 sandwiched between the lines 51 and 53. Since the polygon mirror having a less thickness is more advantageous in terms of cost, a value closer to the line 51 is more preferable.

On the other hand, with such a value close to the line 51, a margin with respect to the light beams and the ray separation of the incident system turn back mirror is reduced. Also, when a beam margin of 3 mm is assumed as the margin, a position obtained by adding "3" to any values on the line 51 representing the lower limit values becomes the lower limit value.

As is apparent from the drawing, it is possible to reduce the thickness in the sub-scanning direction of the polygon mirror while securing the margin by setting the amount of the cross of the beams in the vicinity of d=0, which is the best solution.

<Color Image Forming Apparatus>

Figure 6:
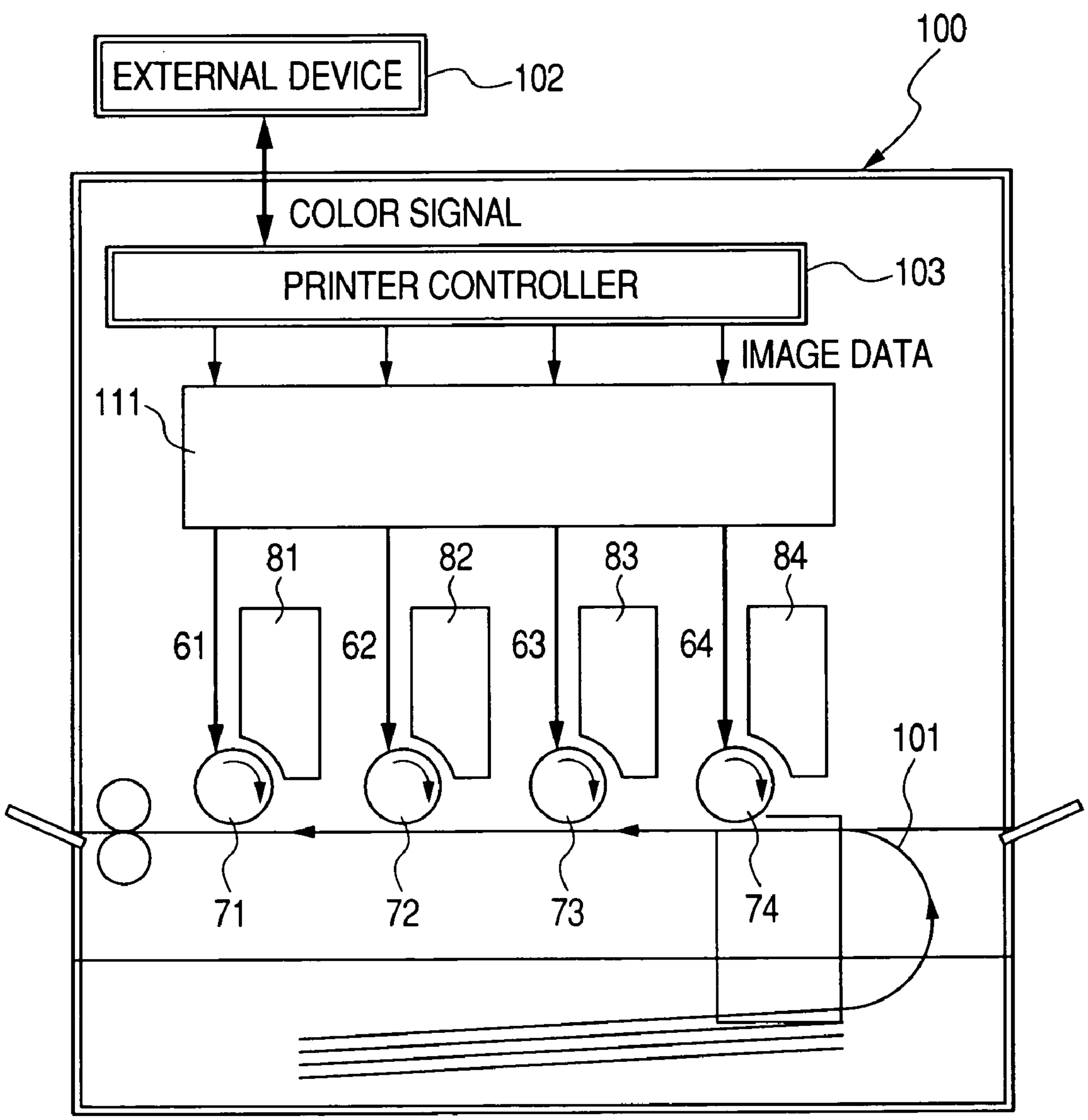
FIG. 6 is a main portion sectional view of a color image forming apparatus according to the present invention.
Figure 7:
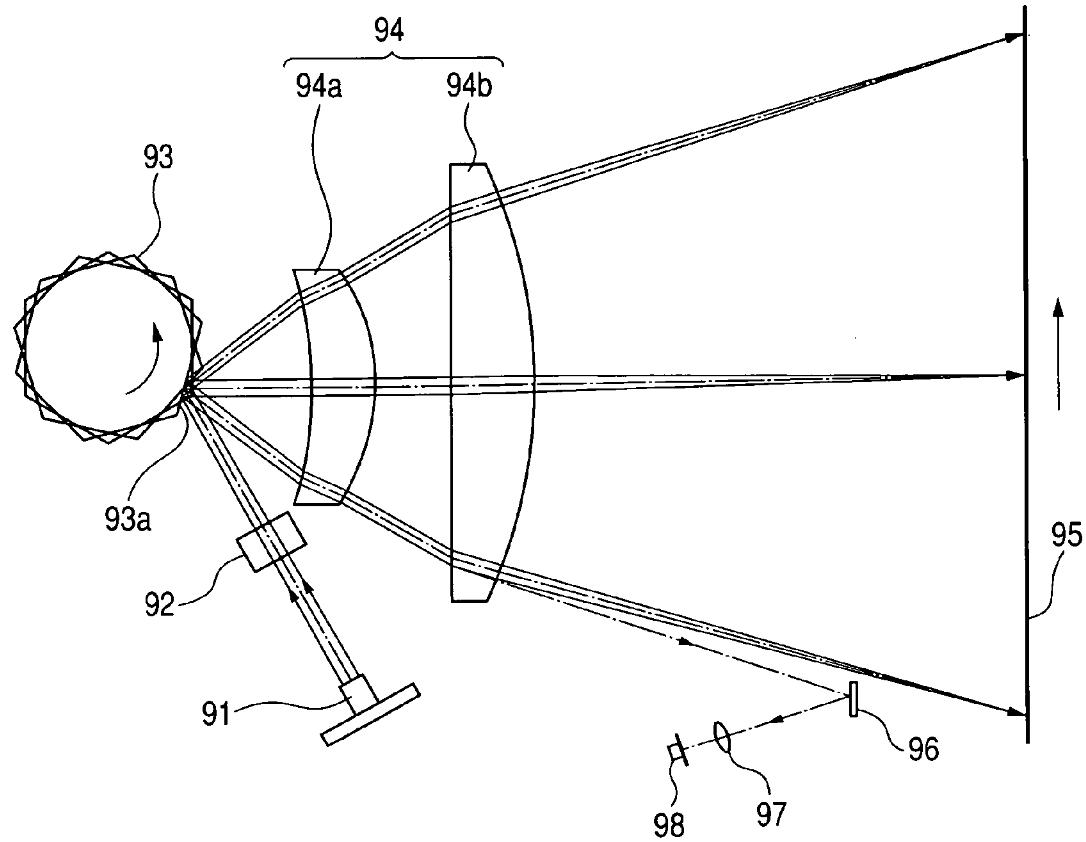
FIG. 7 is a main scanning sectional view of a conventional optical scanning apparatus.

FIG. 6 is a main portion schematic diagram of a color image forming apparatus according to an embodiment of the present invention. The image forming apparatus in this embodiment is a tandem-type color image forming apparatus where one light deflector is shared among multiple light beams and image information is recorded onto surfaces of photosensitive drums serving as image bearing members.

In FIG. 6, reference numeral 100 denotes a color image forming apparatus, reference numeral 111 an image forming apparatus (optical scanning apparatus) having the construction described in the first embodiment or the second embodiment, reference numerals 71, 72, 73, and 74 each a photosensitive drum serving as an image bearing member, reference numerals 81, 82, 83, and 84 each a developer, and reference numeral 101 a conveyance belt.

In FIG. 6, color signals in respective colors of R (red), G (green), and B (blue) are inputted into the color image forming apparatus 100 from an external device 102 such as a personal computer. These color signals are converted, by a printer controller 103 in the apparatus, into image data (dot data) in respective colors of C (cyan), M (magenta), Y (yellow), and B (black). The image data is inputted into the image forming apparatus 111. Then, light beams 61, 62, 63, and 64 modulated in accordance with the image data are emitted from the image forming apparatus to scan the photosensitive surfaces of the photosensitive drums 71, 72, 73, and 74 in the main scanning direction with the light beams.

In the color image forming apparatus in this embodiment, the multiple light beams from the image forming apparatus 111 respectively correspond to the colors of C (cyan), M (magenta), Y (yellow), and B (black), and respectively record the image signals (image information) onto the surfaces of the photosensitive drums 71, 72, 73, and 74 in parallel, thereby printing a color image at high speed.

As described above, the color image forming apparatus in this embodiment forms latent images for the respective colors on the surfaces of the photosensitive drums 71, 72, 73, and 74 using the light beams based on the respective image data by means of one image forming apparatus 111. Following this, one full-color image is formed through multiplex transfer onto a recording material.

A color image reading apparatus provided with a CCD sensor may be employed as the external device 102, for example. In this case, a color digital copying machine is formed by the color image reading apparatus and the color image forming apparatus 100.

This application claims priority from Japanese Patent Application No. 2004-147913 filed May 18, 2004, which is hereby incorporated by reference herein.

What is claimed is:

1. An optical scanning apparatus for scanning a plurality of surfaces to be scanned with light beams, comprising:

a plurality of light source means;

a first turn back mirror for reflecting a plurality of light beams emitted from the plurality of light source means;

a light deflector for deflecting the plurality of light beams reflected by the first turn back mirror, using a same deflecting surface; and an imaging optical system for guiding the plurality of light beams deflected by the same deflecting surface of the light deflector onto different surfaces to be scanned, respectively, wherein the first turn back mirror is disposed within an effective scanning range in a main scanning section when the first turn back mirror is projected in the main scanning section, in a sub-scanning section, the plurality of light beams are reflected by the first turn back mirror in mutually different directions with respect to a normal line direction of a reflecting surface of the first turn back mirror, and made incident on the same deflecting surface of the light deflector at mutually different angles, and the following condition is satisfied, $$2L\cdot\tan(\theta/2)<2L\cdot\tan\alpha\text{-}d\leqq 10,$$

where d represents a largest interval on the first turn back mirror in the sub-scanning direction between two principal rays among principal rays of the plurality of light beams reflected in the mutually different directions with respect to a normal line direction of said reflecting surface of the first turn back mirror, a represents an angle in the sub-scanning direction formed by the principal ray of the light beam among the plurality of light beams incident on the same deflecting surface of the light deflector at the mutually different angles, having a smallest incident angle with respect to the normal line thereof, and the normal line of the deflecting surface, θ represents an incident angle in the sub-scanning direction determined by an F-number of the light beam having the smallest incident angle, and L represents a distance between the deflecting surface of the light deflector and the reflecting surface of the first turn back mirror.

2. An optical scanning apparatus according to claim 1, wherein reflection angles of two light beams reflected in mutually different directions with respect to the normal line direction of the reflecting surface of the first turn back mirror are equal to each other in the sub-scanning section.

3. An optical scanning apparatus according to claim 1, wherein two light beams reflected in mutually different directions with respect to the normal line direction of the reflecting surface of the first turn back mirror cross each other in a vicinity of the first turn back mirror in the sub-scanning section.

4. An optical scanning apparatus according to claim 1, wherein, in the sub-scanning section, the plurality of light beams made incident on the deflecting surface at the mutually different angles with respect to the normal line of the deflecting surface are reflected in mutually different directions with respect to the deflecting surface.

5. An optical scanning apparatus according to claim 1, wherein the plurality of light beams deflected by the light deflector respectively pass outside of the different end portions of both end portions of the reflecting surface of the first turn back mirror in the sub-scanning section.

6. An optical scanning apparatus according to claim 1, comprising:

at least one second turn back mirror that is provided in an optical path between the light deflector and the surfaces to be scanned, and reflects the light beams deflected by the deflecting surface of the light deflector, wherein the at least one second turn back mirror is disposed at a position farther from the light deflector than the first turn back mirror.

7. An optical scanning apparatus according to claim 1, wherein the plurality of light beams reflected in the mutually different directions with respect to the normal line direction of the reflecting surface of the first turn back mirror pass through at least one scanning optical element constituting the imaging optical system to be deflected by the light deflector, and then pass through the at least one scanning optical element again.

8. A color image forming apparatus comprising:

at least one optical scanning apparatus according to claim 1; and a plurality of image bearing members, wherein the plurality of image bearing members are disposed on respective surfaces to be scanned of the at least one optical scanning apparatus, and the plurality of image bearing members form images in mutually different colors.

9. A color image forming apparatus according to claim 8, comprising:

a printer controller for converting a color signal inputted from an external device into image data of mutually different colors and inputs the image data into the respective optical scanning apparatuses.

* * * * *